US012116486B2

(12) United States Patent
Hayashi et al.

(10) Patent No.: US 12,116,486 B2
(45) Date of Patent: Oct. 15, 2024

(54) COATED PIGMENT

(71) Applicant: Toyo Aluminium Kabushiki Kaisha, Osaka (JP)

(72) Inventors: Futa Hayashi, Osaka (JP); Masami Sato, Osaka (JP); Katsura Kawashima, Osaka (JP)

(73) Assignee: Toyo Aluminium Kabushiki Kaisha, Osaka (JP)

(*) Notice: Subject to any disclaimer, the term of this patent is extended or adjusted under 35 U.S.C. 154(b) by 295 days.

(21) Appl. No.: 17/195,933

(22) Filed: Mar. 9, 2021

(65) Prior Publication Data
US 2021/0189143 A1 Jun. 24, 2021

Related U.S. Application Data

(63) Continuation of application No. 16/496,682, filed as application No. PCT/JP2018/011546 on Mar. 22, 2018, now abandoned.

(30) Foreign Application Priority Data

Mar. 31, 2017 (JP) ................................. 2017-073272

(51) Int. Cl.
| B22F 1/14 | (2022.01) |
| B22F 1/16 | (2022.01) |
| C08K 3/08 | (2006.01) |
| C08K 3/10 | (2018.01) |
| C08K 3/22 | (2006.01) |
| C08K 9/02 | (2006.01) |
| C08K 9/06 | (2006.01) |
| C08K 9/08 | (2006.01) |
| C08L 57/00 | (2006.01) |
| C08L 87/00 | (2006.01) |
| C09C 1/62 | (2006.01) |

(Continued)

(52) U.S. Cl.
CPC ................. C09C 1/62 (2013.01); B22F 1/14 (2022.01); B22F 1/16 (2022.01); C08K 3/08 (2013.01); C08K 3/10 (2013.01); C08K 3/22 (2013.01); C08K 9/02 (2013.01); C08K 9/06 (2013.01); C08K 9/08 (2013.01); C08L 57/00 (2013.01); C08L 87/00 (2013.01); C09C 1/64 (2013.01); C09C 1/642 (2013.01); C09C 1/648 (2013.01); C09C 3/12 (2013.01); C09D 5/028 (2013.01); C09D 5/29 (2013.01); C09D 7/62 (2018.01); C09D 7/63 (2018.01); C09D 17/006 (2013.01); C22C 1/0416 (2013.01); C23C 18/1216 (2013.01); C23C 18/122 (2013.01); C01P 2004/03 (2013.01); C01P 2004/61 (2013.01); C01P 2004/62 (2013.01); C08K 2003/0812 (2013.01); C08K 2003/2227 (2013.01); C08K 3/36 (2013.01); C08K 5/5415 (2013.01)

(58) Field of Classification Search
CPC ........... C09C 1/648; C09C 1/64; C09C 1/642; C09C 3/12; C09C 1/62; C09C 3/08; B22F 1/14; B22F 1/16; B22F 1/00; C08K 3/08; C08K 3/10; C08K 3/22; C08K 9/02; C08K 9/06; C08K 9/08; C08K 3/36; C08K 5/5415; C08K 2003/0812; C08K 2003/2227; C08L 57/00; C08L 87/00; C09D 5/028; C09D 5/29; C09D 7/62; C09D 7/63; C09D 17/006; C09D 5/28; C09D 5/02; C09D 17/00; C22C 1/0416; C23C 18/1216; C23C 18/122; C23C 18/00; C01P 2004/03; C01P 2004/61; C01P 2004/62; C01P 2006/62
See application file for complete search history.

(56) References Cited

U.S. PATENT DOCUMENTS 8,088,211 B2 ‡  1/2012  Hashizume ............... C09D 7/62
                                                         106/404
2002/0112644 A1*  8/2002  Nakamura ........... C09D 11/322
                                                         106/499

(Continued)

FOREIGN PATENT DOCUMENTS

JP    2003-113341 A     4/2003
JP    2003-147226 A  ‡  5/2003

(Continued)

OTHER PUBLICATIONS

Fogler & Gurmen (2008) ChE 344 Mixing in Chemical Reactors, Main [accessed by Jan. 24, 2023 from <URL: http://websites.umich.edu/~elements/01chap/html/reactors/mixing/mixmain.htm] (Year: 2008).*

(Continued)

Primary Examiner — Anthony J Green
Assistant Examiner — Marites A Guino-O Uzzle
(74) Attorney, Agent, or Firm — Locke Lord LLP; James E. Armstrong, IV; Nicolas J. DiCeglie, Jr.

(57) ABSTRACT

A main object of the present invention to provide a coated pigment that is composed of a composite particle comprising a silicon compound coated on the surface of a metal particle, and that can be dispersed with relatively few aggregates.

The present invention relates to a coated pigment comprising a composite particle containing a metal particle and one or two or more coating layers on the surface of the metal particle, wherein (1) at least one of the coating layers is a silicon compound-containing layer, and (2) the proportion of aggregates formed by adhesion of at least four of the composite particles with each other is not more than 35% by number.

10 Claims, 1 Drawing Sheet

(51) Int. Cl.
*C09C 1/64* (2006.01)
*C09C 3/12* (2006.01)
*C09D 5/02* (2006.01)
*C09D 5/29* (2006.01)
*C09D 7/62* (2018.01)
*C09D 7/63* (2018.01)
*C09D 17/00* (2006.01)
*C22C 1/04* (2023.01)
*C23C 18/12* (2006.01)
*C08K 3/36* (2006.01)
*C08K 5/5415* (2006.01)

(56) References Cited

U.S. PATENT DOCUMENTS

| | | | | |
|---|---|---|---|---|
| 2006/0150864 | A1* | 7/2006 | Hashizume | C09D 11/037 106/400 |
| 2009/0117281 | A1‡ | 5/2009 | Sato | C09C 1/62 427/32 |
| 2013/0011639 | A1‡ | 1/2013 | Nakajima | C09D 5/38 428/195.1 |
| 2016/0178804 | A1* | 6/2016 | Shen | G02B 1/10 423/606 |

FOREIGN PATENT DOCUMENTS

| | | | |
|---|---|---|---|
| JP | 2004-124069 A | ‡ | 4/2004 |
| JP | 2009-007616 A | ‡ | 1/2009 |
| JP | 4216903 B2 | ‡ | 1/2009 |
| JP | 2015-078321 A | ‡ | 4/2015 |
| WO | WO-2004/96921 A1 | ‡ | 11/2004 |
| WO | WO-2007/43453 A1 | ‡ | 4/2007 |

OTHER PUBLICATIONS

Fogler & Gurmen (2008) ChE 344 Mixing in Chemical Reactors, Introduction [accessed by Jan. 24, 2023 from <URL: http://websites.umich.edu/~elements/01chap/html/reactors/mixing/intro.htm>] (Year: 2008).*

Fogler & Gurmen (2008) ChE 344 Mixing in Chemical Reactors, Dimensionless number [accessed by Jan. 24, 2023 from <URL: http://websites.umich.edu/~elements/01chap/html/reactors/mixing/dn.htm] (Year: 2008).*

Fogler & Gurmen (2008) ChE 344 Mixing in Chemical Reactors, Correlations [accessed by Jan. 24, 2023 from <URLs: http://websites.umich.edu/~elements/01chap/html/reactors/mixing/correlations.htm>] (Year: 2008).*

International Search Report mailed Jun. 5, 2018, issued for PCT/JP2018/011546.‡

* cited by examiner
‡ imported from a related application

[Fig. 1]
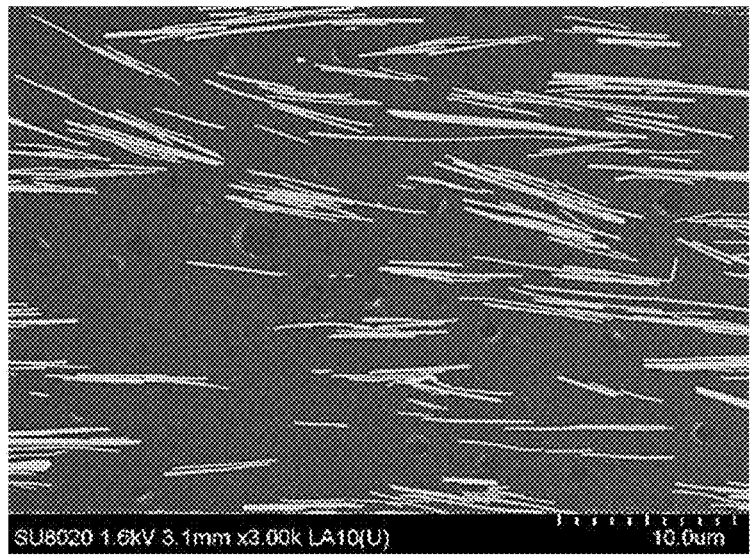
[Fig. 2]
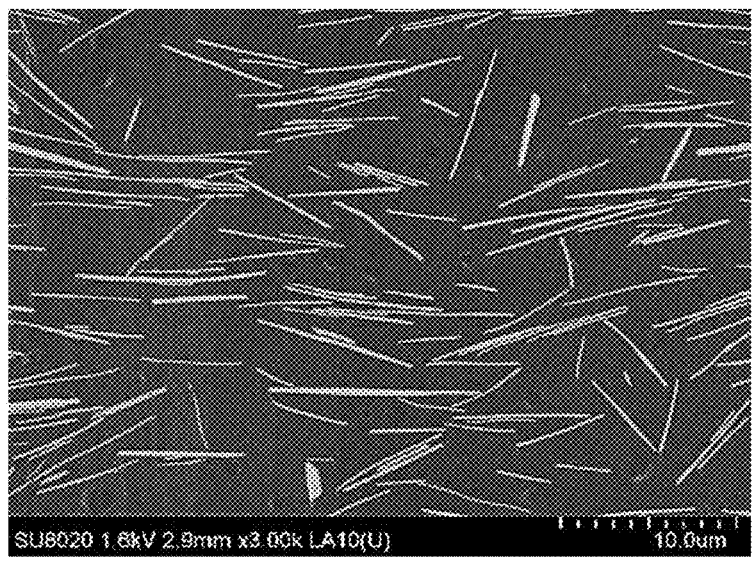

COATED PIGMENT

TECHNICAL FIELD

The present invention relates to a novel coated pigment. More specifically, it relates to a pigment that can provide superior hiding power and the like because the individual particles are highly dispersed.

BACKGROUND ART

Attention in the paint industry has recently focused on low-emission paints in an effort to reduce environmental impacts. Low-emission paints are paints in which the content of hydrocarbons in the solvent or the like is either 0% or very low, such as water-based paints, solvent-free paints (powder paints) and the like. As in the case of conventional organic solvent-based paints, the use of metal pigments is essential in such low-emission paints because a metallic appearance is required for a broad range of applications. However, taking the example of paints using aluminum pigments, which are especially common as metal pigments, the problem in the case of water-based paints is that the aluminum pigments may turn black or emit hydrogen gas when they react with water in the paint.

Therefore, to improve the stability of metal pigments in water-based paints, for example, pigments comprising aluminum particles coated with amorphous silica or the like have been proposed (Patent Document 1, (Patent Document 2, etc.).

For purposes other than improving the stability of metal pigments in water-based paints, interference pigments comprising low refractive index layers and high refractive index layers or transparent layers and metal layers deposited on aluminum pigment base materials have been proposed in the fields of paints, coatings, printing, cosmetics and the like in addition to conventional silver metal pigments. For example, a colored metal pigment has been proposed (Patent Document 3) comprising at least a metal pigment, an amorphous silicon oxide film layer formed on the surface of the metal pigment, a metal layer formed on the surface of the amorphous silicon oxide film layer, and metal particles formed on the surface of the metal layer, wherein the metal particles are provided so as to directly cover a part of the metal layer.

CITATION LIST

Patent Document

[Patent Document 1] WO2004/096921
[Patent Document 2] Japanese Patent Application Publication No. 2003-147226
[Patent Document 3] Japanese Patent No. 4216903

SUMMARY OF INVENTION

Technical Problem

When the surface of a metal pigment is coated with amorphous silica or the like, however, the hiding power after coating is less than before coating, and brightness declines as a result.

To investigate the causes of this, we analyzed and researched the existence states and the like of metal pigments in coated films before and after the metal pigments were coated with amorphous silica and the like, and confirmed significant differences in composition. More specifically, we confirmed that before a metal pigment is coated with amorphous silica or the like the individual pigment exist relatively independently in the coating, but after it is coated with amorphous silica or the like aggregate particles including two or more metal particles become coated with the amorphous silica or the like, or the amorphous silica may actually act as an adhesive to produce aggregates including two or more pigment (particles).

As mentioned above, pigments that have been coated with amorphous silica or the like often exist as aggregates. It is thought that the hiding power per unit mass declines as a result, and only coatings with poor brightness can be obtained. These problems also tend to become more serious when the number of particles constituting the aggregates become greater. Similarly, the problems also become more serious, the number of the aggregates themselves increases.

Thus, it is a main object of the present invention to provide a coated pigment that is composed of a composite particle comprising a silicon compound coated on the surface of a metal particle, and that can be dispersed with relatively few aggregates.

Problem to be Solved

As a result of exhaustive research into these problems of prior art, the inventors found that the above object is achieved and perfected the present invention based on the knowledge that a coated pigment having a unique structure can be obtained by employing a specific preparation method.

That is, the present invention relates to the following coated pigment.

1. A coated pigment comprising a composite particle comprising a metal particle and one or two or more coating layers on the surface of the metal particle, wherein
   (1) at least one of the coating layers is a silicon compound-containing layer, and
   (2) the proportion of aggregates constituted by adhesion of at least four of the composite particles with each other is not more than 35% by number.
2. The coated pigment according to 1 above, wherein the shape of the composite particle is a flake shape, and the volume-based D50 obtained by measuring the particle size distribution with a laser diffraction particle size distribution analyzer is 0.1 to 50 µm.
3. A coated pigment according to 1 or 2 above, comprising at least two coating layers on the particle, and also comprising a coating layer including at least one kind selected from metals, metal oxides, metal hydrates and resins.
4. A coated pigment according to any one of 1 to 3 above, wherein at least the silicon compound-containing layer is disposed as the outermost layer.
5. A coated pigment according to any one of 1 to 4 above, wherein the metal particle is aluminum or an aluminum alloy.

Advantageous Effects of Invention

With the present invention, it is possible to provide a coated pigment that is composed of a composite particle comprising a silicon compound coated on the surface of a metal particle, and that can be dispersed with relatively few aggregates.

In particular, in the present invention the composite particle can be produced and maintained in a highly dispersed state because the composite particle is manufactured by subjecting a metal particle to a coating process under stirring under specific conditions. As a result, aggregates (aggregated particles) constituted by adhesion of composite particles with each other can be greatly reduced. More specifically, it is possible to achieve a low value of not more than 35% on the number basis as the proportion of aggregates formed by adhesion of at least four of the composite particles with each other. By thus effectively reducing the number of aggregates of many composite particles, it is possible to provide a pigment with a strong hiding force per unit mass.

Thus, the highly dispersible coated pigment of the present invention can be used in a wide range of applications including various paints, inks, writing implements, electronic materials and parts, automobile parts, household electrical goods, cosmetics and the like for example.

BRIEF DESCRIPTION OF DRAWINGS

FIG. 1 is a cross-sectional SEM image of a coating formed using a coated pigment (Comparative Example 1) manufactured by a conventional technology.

FIG. 2 is a cross-sectional SEM image of a coating formed using a coated pigment (Example 1) of the present invention.

DESCRIPTION OF EMBODIMENTS

1. Coated Pigment

The coated pigment of the present invention (pigment of the invention) is a pigment comprising a composite particle comprising a metal particle and one or two or more coating layers on the surface of the metal particle, wherein (1) at least one of the coating layers is a silicon compound-containing layer, and
(2) the proportion of the number of aggregates constituted by adhesion of at least four of the composite particles with each other is not more than 35%.

Metal Particle

The composite particle constituting the pigment of the invention comprises a metal particle and one or two or more coating layers formed on the surface of the metal particle. That is, the composite particle has one or two or more coating layers formed on the surface of a metal particle that serves as a core. A group of such composite particles constitutes the pigment (powder) of the invention.

The material of the metal particle (core particle) constituting the composite particle is not particularly limited, and any metal used as a known or commercial metal pigment may be used, such as aluminum, aluminum alloy, copper, silver, tin, chromium, stainless steel or the like. In the present invention, the term "metal" encompasses not only metals by themselves but also alloys and intermetallic compounds.

Moreover, the metal particle need not necessarily be composed only of a metal, and a particle obtained by coating a metal on the surface of a synthetic resin particle or an inorganic particle of mica, glass or the like for example may also be used as long as the advantages of the present invention are obtained. An aluminum or aluminum alloy particle is especially desirable in the present invention for reasons of weather resistance, low specific gravity, availability and the like.

The average particle diameter of the metal particle is not particularly limited, and the metal particle may be any that produces the average particle diameter described below. In other words, the volume-average particle diameter (D50) of the metal particle may be set so that the D50 of the pigment of the invention is 0.1 to 50 μm when the volume distribution of the pigment is measured with a laser diffraction particle size distribution analyzer.

The shape of the metal particle is not particularly limited, but a flake shape is particularly desirable. This allows the composite particle constituting the pigment of the invention to also assume a flake shape, so that a high level of hiding power can be obtained more reliably. From this perspective, the aspect ratio of the flake-shaped metal particle (shape factor obtained by dividing average particle diameter by average thickness) is preferably 5 to 1,000, or especially 15 to 500. If the aspect ratio is less than 5, brilliance is likely to be insufficient. If the aspect ratio exceeds 1,000, on the other hand, the color tone may be unstable because the mechanical strength of the flakes is reduced. The average thickness of the metal particle used in the present invention is calculated here from the water covering area and density of the metal particle.

Coating Layer (Silicon Compound-Containing Layer)

In the composite particle constituting the pigment of the invention, one or two or more coating layers are formed on the surface of a metal particle, and at least one of the coating layers is a silicon compound-containing layer. The composite particle of the invention encompasses those having other layers as coating layers instead of the silicon compound-containing layer or in addition to the silicon compound-containing layer. Examples include coating layers comprised of metal oxides such as titanium oxide, zirconium oxide and iron oxide. The explanation below focuses on a silicon compound-containing layer as a typical example of a coating layer.

The silicon compound-containing layer is preferably a layer composed of a compound containing Si—O bonds in particular (hereunder also called an "Si—O coating layer"). Examples of such layers include layers containing at least one kind of silane compound or silicon oxide. Examples include silane compounds $[H_3SiO(H_2SiO)nSiH_3]$ (in which n is any positive integer) and silicon oxides represented by $SiO_2$, $SiO_2 \cdot nH_2O$ (in which n is any positive integer) and the like. These compounds may be either crystalline or amorphous, but amorphous compounds are especially desirable. Accordingly, a layer containing amorphous silica can be employed by preference as a layer containing a silicon oxide (silica, etc.).

Layers formed using organic silicon compounds (including silane coupling agents) as starting materials for example may also be used as the Si—O coating layer. Consequently, the silicon compound-containing layer may also contain an organic silicon compound or a component derived therefrom as long as they do not substantially adversely affect the advantages of the present invention.

In addition, the silicon compound-containing layer need not be a coating consisting solely of a silicon compound, and may also contain additives, impurities and the like other than the silicon compound to the extent that the characteristics required in the present invention are not adversely affected.

The silicon content of the silicon compound-containing layer here is not particularly limited, but is preferably 1 to 20 parts by mass, or more preferably 2 to 15 parts by mass per 100 parts by mass of the metal particle. If the silicon content is less than 1 part by mass, corrosion resistance, water dispersibility, stability and the like tend to decline. If the silicon content exceeds 20 parts by mass, the aluminum pigment may aggregate, the hiding power may decline, and color tone such as metallic luster may be adversely affected.

In the present invention, it is especially desirable for a coating layer to be hydrophilic. If a coating layer has a hydrophilic surface, the composite particle can be highly dispersed in an aqueous solvent (water or a mixed solvent containing water and an organic solvent). Furthermore, because silicon oxides (amorphous silica and the like) are extremely stable in aqueous solvents, it is possible to provide a pigment that is extremely stable in aqueous solvents. From this perspective, at least the outermost layer is preferably a layer containing a silicon-containing compound (especially an Si—O coating layer) in the pigment of the invention. In this case, if the coating layer is composed of multiple layers, a layer containing a silicon-containing compound (especially an Si—O coating layer) may also be formed separately as a layer other than the outermost layer to the extent that this does not detract from the advantages of the present invention.

The thickness of the coating layer is not particularly limited, but normally is preferably in the range of about 1 to 2,500 nm (especially 1 to 2,000 nm, or more preferably 1 to 1,500 nm). If the thickness is too small, water resistance will be insufficient, potentially causing corrosion or discoloration of the metal particle in a water-based paint. If the coating layer is too thick, on the other hand, the composite particle will be too thick, and brightness may decline because the composite particles overlap one another, disturbing the orientation of the composite particles in the coated film. Even if the individual composite particles can be highly dispersed, the distinctness of image of the coated film may decline because the surface roughness of the coated film is increased. Moreover, hiding power may also decline because the proportion of composite particles in the coated pigment per unit mass decreases.

The thickness of the silicon compound-containing layer is also not particularly limited, but in order to more reliably obtain the functions of the silicon compound-containing layer, the thickness is preferably in the range of 1 to 1,500 nm, or especially in the range of 10 to 1,000 nm.

Coating Layer (Other Layer)

A coating layer (hereunder called the "second coating layer") other than the silicon compound-containing layer may also be formed as necessary as a coating layer of the pigment of the invention. For example, a molybdenum-containing coating or a phosphate compound coating or the like may be formed. It is especially desirable to form the second coating layer between the metal particle and the silicon compound-containing layer. Accordingly, for example a layer configuration of "metal particle/second coating layer/silicon compound-containing layer" can be adopted by preference.

To further improve the corrosion resistance of the core metal particle (preferably aluminum particle or aluminum alloy particle) in particular, the second coating layer may also be a layer containing another corrosion inhibitor. There are no particular limits on the corrosion inhibitor added, and a known corrosion inhibitor can be used in an amount that does not detract from the advantageous effects of the invention. Examples include acidic phosphoric acid esters, dimer acids, organic phosphorus compounds, metal salts of molybdic acid and the like.

Coated Pigment (Composite Particle)

In the coated pigment of the present invention the proportion of the number of aggregates (aggregate particles) constituted by adhesion of at least four composite particles with each other is not more than 35%, or preferably not more than 30%, or more preferably not more than 20%, or yet more preferably not more than 10% on the basis of the total number of particles.

The lower limit of the proportion is not particularly limited, but can be about 5% for example.

In aggregates formed by adhesion of at least four composite particles with each other, four or more composite particles aggregate and interlock to function as a single particle, and is not separated into individual particles again by ordinary dispersion operations. Aggregates here also include those constituted by aggregation of at least four metal particles. For example, they include those in which a coating layer is formed after aggregation of at least four metal particles.

In the present invention, the proportion of aggregates represents the results of observation of all of coated pigment composed of 500 to 600 particles obtained by random sampling. Observation is performed in multiple fields so that the total number of observed particles is at least 500. More specifically, observation may be performed by the methods described below under Test Example 1, "(2) Evaluating degree of overlapping by composite particles".

Thus, because the proportion of aggregates constituted by at least four composite particles, which are relatively large numbers of composite particles, is minimized in the pigment of the invention, the hiding power per unit mass of the pigment of the invention is increased, and even greater brightness and the like can be achieved. In other words, this excellent hiding power and brightness of the pigment of the invention can be achieved because most of the individual composite particles do not aggregate in large quantities, and effectively exist independently at a level that does not detract from their hiding power.

If the proportion A is over 35%, the hiding power of a coating film formed by the pigment of the invention decreases due to the presence of large numbers of composite particle in an aggregated state in the coating film, and good brightness is also not obtained because the orientation of the composite particles in the coating film is disturbed (fewer of the composite particles are arranged parallel to the coating surface). Furthermore, when relatively large numbers of individual composite particles aggregate together, because the apparent thickness of the composite particles increases it increases the surface roughness of the coating film and causes a decline in the distinctness of image (DOI) of the coating film. In contrast, in the present invention, by controlling the proportion A within a specific range, the hiding power and brightness of the pigment of the invention can be improved and design properties such as distinctness can also be improved.

The particle diameter of the pigment of the invention (composite particle) is not particularly limited, but preferably the volume-based median diameter D50 is 1 to 50 μm as measured by laser diffraction. It can thus be set to about 10 to 40 μm for example. If the D50 is less than 1 μm, the core metal particle must therefore be a correspondingly fine particle, and in this case the percentage of metal particles that adhere to one another increases in the step of coating the surface of the metal particle with the silicon compound-containing layer, potentially detracting from the hiding power and brightness. If the D50 is over 50 μm, on the other hand, it is easy to obtain a highly independent coated particle without using the method of the invention.

The D50 here is the 50% cumulative particle diameter ($D_{50}$) in a volume cumulative particle size distribution obtained by laser diffraction. Because the particle diameter of a coated pigment in a resin composition as discussed below cannot be measured by such a method, a method can be substituted in which the coated pigment in the resin composition is observed from the coating surface with an optical microscope, laser microscope or the like, and the distribution of the major axes (distance between the two most distant points on the outline of the coated pigment in two-dimensional analysis) is then obtained using commercial image processing software to determine the particle diameter for example.

The shape of the composite particle is not particularly limited, but a flake shape is particularly desirable as in the case of the metal particle. A coating film of the pigment of the invention can thus achieve strong hiding power and the like. From this perspective, the aspect ratio of the flake-shaped composite particle (shape factor obtained by dividing average particle diameter by average thickness) is preferably 5 to 1,000, or especially 15 to 500. If the aspect ratio is less than 5, brilliance is likely to be insufficient. If the aspect ratio exceeds 1,000, on the other hand, the color tone may be unstable because the mechanical strength of the flakes is reduced. The average thickness is calculated here from the covering diffusion area and density of the composite particle.

2. Coated Pigment Manufacturing Method

The pigment of the invention can be manufactured favorably by a manufacturing method that includes a step of coating a silicon compound-containing layer onto a metal particle under stirring for example. More specifically, the method may be the following.

Namely, the pigment of the invention can be manufactured favorably by a manufacturing method comprising a step (silicon compound-containing layer-forming step) in which an organic silicon compound is hydrolyzed in a liquid mixture containing (a) a metal particle, (b) a silicon-containing raw material including at least one kind of the organic silicon compound and (c) a solvent to thereby form a silicon compound-containing layer on the surface of the metal particle, wherein at least this step is performed under stirring.

Silicon Compound-Containing Layer-Forming Step

The liquid mixture can be prepared by mixing (a) a metal particle, (b) a silicon-containing raw material including at least one kind of organic silicon compound, and (c) a solvent.

A metal particle described under the above 1. can be used as the metal particle. In particular, a particle of aluminum or an aluminum alloy can be favorably used as a metal particle in the present invention. As explained under the above 1., moreover, a flake-shaped metal particle can be used by preference. Known or commercial metal particles can be used as these metal particles.

The content (solids content) of the metal particle in the liquid mixture is not particularly limited, and can be set appropriately according to the type and particle diameter of the metal particle used.

An organic silicon compound is used as a silicon-containing raw material. The organic silicon compound is not particularly limited, but for example at least one kind selected from 1) a tetraalkoxysilane, 2) a tetraalkoxysilane condensate and 3) a silane coupling agent may be used by preference. The above 1) and 2) here are together called "tetraalkoxysilane" unless otherwise specified.

In particular, when a tetraalkoxysilane and a silane coupling agent are used together, it is possible to use a method using a mixture of the two (first method), or a method including a step of treating with one to form a first silicon compound-containing layer, and then treating with the other to form a second silicon compound-containing layer (second method).

An example of the first method is a method including a step in which the pH of a liquid mixture containing a metal particle, a tetraalkoxysilane and a silane coupling agent is adjusted to thereby hydrolyze the tetraalkoxysilane and the silane coupling agent and form a silicon compound-containing layer.

An example of the second method is a method including a step in which the pH of a liquid mixture containing a metal particle and a tetraalkoxysilane is adjusted to thereby hydrolyze the tetraalkoxysilane and form a first silicon compound-containing layer (silica coating including amorphous silica for example) on the surface of the metal particle, and a step in which the pH of a liquid mixture containing the particle obtained above and a silane coupling agent is adjusted to thereby hydrolyze the silane coupling agent and form a second silicon compound-containing layer on the surface of the first silicon compound-containing layer.

The tetraalkoxysilane that is one silicon-containing raw material is not particularly limited as long as it can serve as a precursor for forming an Si—O coating layer such as an amorphous silica layer, and tetraethoxysilane, tetramethoxysilane, tetraisopropoxysilane or the like or a condensate of these may be used. These tetraalkoxysilanes can be used independently, or two or more may be combined.

The amount of the tetraalkoxysilane or condensate thereof that is used can be set appropriately according to the type of tetraalkoxysilane and the like, but normally is preferably 2 to 200 parts by mass, or more preferably 5 to 100 parts by mass per 100 parts by mass of the metal particle. If the content is less than 2 parts by mass, the merit of treatment tends to be insufficient. If the content exceeds 200 parts by mass, on the other hand, there may be more aggregation of metal particles or a conspicuous decrease in brilliance.

The silane coupling agent that is one silicon-containing raw material is not particularly limited as long as it can serve as a precursor for forming an Si—O coating layer, and a known or commercial silane coupling agent may be used. More specific examples include organic silane compounds other than tetraalkoxysilanes. Examples include methyl triethoxysilane, methyl trimethoxysilane, dimethyl dimethoxysilane, trimethyl methoxysilane, dimethyl diethoxysilane, trimethyl ethoxysilane, 3-aminopropyl-trimethoxysilane, n-methyl-3-aminopropyl-trimethoxysilane, 3-aminopropyl-triethoxysilane, 3-aminopropyl-tris(2-methoxy-epoxysilane), n-aminoethyl-3-aminopropyl trimethoxysilane, n-aminoethyl-3-aminopropyl-methyl-dimethoxysilane, 3-methacryloxypropyl-trimethoxysilane, 3-methacryloxypropyl-methyl-dimethoxysilane, 3-acryloxypropyl-trimethoxysilane, 3-glycidyloxypropyl-trimethoxysilane, 3-glycidyloxypropyl-methyl-dimethoxysilane, 3-mercaptopropyl-trimethoxysilane, 3-mercaptopropyl-triethoxysilane, 3-mercaptopropyl-methyl-dimethoxysilane, vinyl trichlorosilane, vinyl trimethoxysilane, vinyl triethoxysilane, vinyl-tris(2-methoxyethoxy) silane, vinyl triacetoxysilane, 3-(3,4-epoxycyclohexylethyltrimethoxy) silane, γ-aminopropyl triethoxysilane, N-β-(aminoethyl)-γ-aminopropyl trimethoxysilane, 3-ureidopropyl triethoxysilane, 3-chlorpropyl trimethoxysilane, 3-anilidopropyl trimethoxysilane, 3-(4,5-dihydroimidazolpropyltriethoxy) silane, n-phenyl-3-aminopropyl trimethoxysilane, heptadecafluorodecyl trimethoxysilane, tridecafluorooctyl trimethoxysilane, trifluoropropyl trimethoxysilane, 3-isocyanatopropyl triethoxysilane, p-styryl trimethoxysilane and the like. One or two or more kinds of these may be used.

In the present invention, the following compounds are examples of especially desirable silane coupling agents:

(in which $R_A$ represents a $C_{2-18}$ alkyl group, $C_{2-18}$ aryl group or $C_{2-18}$ alkenyl group, and $R_B$ represents a $C_{1-3}$ alkyl group).

Examples of such compounds include at least one of n-propyl trimethoxysilane, isobutyl trimethoxysilane, octyl triethoxysilane, decyl trimethoxysilane, octadecyl triethoxysilane, phenyl trimethoxysilane, phenyl triethoxysilane, diphenyl diethoxysilane and the like.

The amount of the silane coupling agent used is not particular limited, but is normally about 0.1 to 20 parts by mass or especially 1 to 10 parts by mass per 100 parts by mass of the metal particle. If this amount is less than 0.1 part by mass, the desired effects may not be obtained. If this amount exceeds 10 parts by mass, on the other hand, the physical coating properties and the like may decline because there is too much unreacted silane coupling agent.

The solvent in the liquid mixture can be selected appropriately according to the type of silicon-containing raw material and the like, and may normally be 1) water, 2) a hydrophilic organic solvent, or (3) a mixed solvent of these. Of these, it is desirable to include a hydrophilic organic solvent in order to avoid abnormal reactions between the metal particles and water as much as possible. Accordingly, a mixed solvent of water and a hydrophilic organic solvent can be used by preference in the present invention.

Examples of hydrophilic organic solvents include methyl alcohol, ethyl alcohol, isopropyl alcohol, n-propyl alcohol, t-butyl alcohol, n-butyl alcohol, isobutyl alcohol, ethyl cellosolve, butyl cellosolve, propylene glycol monobutyl ether, dipropylene glycol monomethyl ether, propylene glycol monopropyl ether, acetone and the like. One or two or more kinds of these can be used.

When using a mixed solvent of water and a hydrophilic organic solvent as the solvent above, the ratios of each are not particularly limited, but from the perspective of preventing abnormal reactions between the metal particles and water, the content of water is preferably not more than 20 mass % given 100 mass % as the total of the two. In this case there is no particular lower limit on the water content, which may normally be about 1 mass %.

The amount of the solvent used is not particularly limited, but may normally be about 500 to 10,000 parts by mass or preferably 1,000 to 5,000 parts by mass per 100 parts by mass of the metal particle. If this amount is less than 500 parts by mass the viscosity of the mixture (slurry) may increase, making stirring difficult. If the amount exceeds 10,000 parts by mass, on the other hand, the costs of collecting and recycling the treatment liquid tend to increase.

Other additives may be added as necessary in the liquid mixture so as to not adversely affect the advantages of the invention. Examples include catalysts such as hydrolysis catalysts and dehydration condensation catalysts, as well as surfactants, metal corrosion inhibitors and the like.

Of these, a hydrolysis catalyst can be used by preference in the present invention. By using a hydrolysis catalyst, it is possible to not only adjust the pH of the liquid mixture, but also to efficiently hydrolyze and dehydration condense the organic silicon compound, allowing a silicon compound-containing layer to be efficiently and reliably formed on the surface of the metal particle.

A known or commercial hydrolysis catalyst may be used, without any particular limitations. Examples include basic hydrolysis catalysts such as monoethanolamine, diethanolamine, triethanolamine, ammonia, ethylenediamine, t-butylamine, 3-aminopropyl triethoxysilane, n-2-aminoethyl-3-aminopropyl triethoxysilane, n-2-aminoethyl-3-aminopropyl methyl dimethoxysilane, urea, sodium silicate and sodium hydroxide, and acidic hydrolysis catalysts such as oxalic acid, acetic acid, nitric acid, sulfuric acid, phosphoric acid, phosphonic acid and the like. One or two or more kinds of these may be used.

The amount of the hydrolysis catalyst is not particularly limited, but may normally be 0.1 to 20 parts by mass, or preferably 0.5 to 10 parts by mass per 100 parts by mass of the metal particle. If the amount is less than 0.1 part by mass, the precipitation amount of the silicon compound-containing layer may be insufficient. If the amount exceeds 20 parts by mass, on the other hand, aggregation of metal particles tends to be much greater.

When preparing the liquid mixture, mixing may be performed so that these components can be uniformly mixed in the liquid mixture, and the order of addition is not particularly limited. However, as discussed below, it is necessary to prepare the liquid mixture under stirring in the present invention.

The temperature of the liquid mixture may be room temperature or heated. Normally it may be 20° C. to 90° C., and 30° C. to 80° C. is especially desirable. If the temperature is below 20° C., the rate of formation of the silicon compound-containing layer is slower, and the processing time tends to be greater. If it exceeds 90° C., on the other hand, it becomes difficult to control the reaction, and the desired composite particle may not be obtained.

A silicon compound-containing layer is formed on the surface of the metal particle in the liquid mixture by hydrolysis of the silicon-containing raw material. This hydrolysis can be accomplished in particular by pH adjustment of the liquid mixture or the like.

When adjusting the pH, it is desirable to adjust the pH appropriately so that it can be maintained within a fixed range at the stage of forming the silicon compound-containing layer on the surface of the metal particle because the pH of the liquid mixture fluctuates especially at this stage. It is desirable to adjust the pH by adding a hydrolysis catalyst at this stage, but the pH may also be adjusted using another acidic or alkaline compound as long as the properties of the pigment of the invention are not adversely affected.

In the present invention, the pH of the liquid mixture is preferably controlled as follows when using a hydrolysis catalyst.

When using a basic hydrolysis catalyst as the hydrolysis catalyst, the pH is preferably 7 to 11, or especially 7.5 to 10. If the pH is less than 7, the silicon compound-containing layer may form more slowly. If the pH exceeds 11, on the other hand, the metal particles may aggregate or brilliance may decline. There is also a risk of hydrogen gas occurring due to corrosion. From the perspective of quality, using an acidic hydrolysis catalyst is not much different from using a basic hydrolysis catalyst.

When using an acidic hydrolysis catalyst, the pH is preferably 1.5 to 4, or especially 2 to 3. If the pH is less than 1.5, the desired coated particle may not be obtained because the reaction cannot be controlled. If the pH exceeds 4, on the other hand, the silicon compound-containing layer tends to be precipitated more slowly.

Step of Forming Second Coating Layer

In the present invention, if necessary, a second coating layer can be formed on the surface of the metal particle prior to forming the silicon compound-containing layer with the aim of improving the corrosion resistance of the metal particle for example and promoting the formation of the silicon compound-containing layer and the like.

As shown above, various kinds of coatings are possible as the second coating layer. Thus, a molybdenum-containing coating film may be formed as the second coating layer for example. When a molybdenum-containing coating film is formed, it serves as a nucleus or seeds for precipitation to facilitate formation of a silicon compound-containing layer that covers more of the surface of the molybdenum-containing coating film. Because a molybdenum-containing coating film has a certain degree of corrosion resistance, moreover, it can increase the corrosion resistance of the coated pigment of the invention. Furthermore, a molybdenum-containing coating film also has the ability to control or prevent abnormal reactions by metal particles in the liquid mixture in the step of forming the silicon compound-containing layer. Formation of a molybdenum-containing coating film as a second coating layer is explained below as a typical example.

Thus, the present invention encompasses a manufacturing method comprising a step of forming a molybdenum-containing coating film on the surface of the metal particle by stirring a dispersed solution containing the metal particle and a molybdenum compound prior to forming the silicon compound-containing layer.

The method for forming the molybdenum-containing coating film on the surface of the metal particle is not particularly limited, and may be any capable of uniformly stirring a liquid mixture containing a molybdenum compound and a metal particle in an aqueous solvent. One example is a method of forming a molybdenum-containing coating film on the surface of a metal particle by stirring or kneading a dispersion solution of the molybdenum compound and the metal particle in a slurry or paste form. The molybdenum compound may be either dissolved or dispersed in the dispersion solution. Consequently, it is possible to use a dispersion solution in which the molybdenum compound is dissolved for example.

The stirrer or mixer used in the step of stirring the dispersion solution containing the molybdenum compound and the metal particle is not particularly limited, and a known mixer capable of efficiently and uniformly stirring a dispersion solution containing a molybdenum compound and an aluminum particle may be used. Specific examples include kneaders, kneading machines, rotating container agitators, stirring reaction tanks, V-shaped mixers, double cone mixers, screw mixers, sigma mixers, flash mixers, airflow agitators, ball mills, edge runner mixers and the like.

The molybdenum compound used as a starting material is not particularly limited, and may be any that can serve as a precursor for forming a molybdenum-containing coating film when added and stirred with a liquid dispersion containing a metal particle. Examples include peroxo-polymolybdic acid, ammonium molybdate, phosphomolybdic acid and the like. These molybdenum compounds may be used individually, or two or more may be combined. Peroxo-polymolybdic acid in particular can be used favorably in the present invention. Peroxo-polymolybdic acid is a compound ordinarily represented by compositional formula (1) below, and can be prepared by dissolving metal molybdenum powder, molybdenum oxide or the like in a in a 5% to 40% aqueous hydrogen peroxide solution:

$$Mo_xO_y \cdot mH_2O_2 \cdot nH_2O \quad (1)$$

(wherein x represents 1 or 2, y represents an integer from 2 to 5, and m and n represent any positive integers).

The amount of the molybdenum compound used may be set appropriately according to the type of molybdenum compound used and the like, but may ordinarily be 0.02 to 20 parts by mass, or preferably 0.1 to 10 parts by mass per 100 parts by mass of the metal particle. If the content is less than 0.02 part by mass, the profitable effect of treatment may be insufficient. If it exceeds 20 parts by mass, on the other hand, the resulting coated pigment may be insufficiently brilliant.

Normally 1) water, 2) a hydrophilic organic solvent or 3) a mixture of these may be used as the solvent for stirring the metal particle with the molybdenum compound.

Examples of hydrophilic organic solvents include methyl alcohol, ethyl alcohol, isopropyl alcohol, n-propyl alcohol, t-butyl alcohol, n-butyl alcohol, isobutyl alcohol, ethyl cellosolve, butyl cellosolve, propylene glycol monobutyl ether, dipropylene glycol monomethyl ether, propylene glycol monopropyl ether, acetone and the like. One or two or more of these can be used.

In the present invention, a mixed solvent of water and a hydrophilic organic solvent is preferred over a hydrophilic organic solvent alone. This is because the rate of contact between the metal particle and the molybdenum compound can be further increased by using a mixed solvent of water and a hydrophilic organic solvent.

The amount of the solvent used is not particularly limited, but normally is preferably 50 to 5,000 parts by mass, or more preferably 100 to 2,000 parts by mass per 100 parts by mass of the metal particle. If the amount of the solvent is less than 50 parts by mass, the molybdenum compound becomes unevenly distributed, and the metal particles tend to aggregate conspicuously. If it exceeds 5,000 parts by mass, on the other hand, the treatment effect of the metal particle by the molybdenum compound may be insufficient.

In the step of stirring a liquid mixture containing the metal particle and the molybdenum compound, the temperature of the liquid mixture during the stirring step may normally be about 10° C. to 100° C., or especially 30° C. to 80° C. If the temperature is below 10° C., the reaction time required to obtain a sufficient treatment effect tends to be longer. If it exceeds 100° C., on the other hand, the reaction may not be controllable, and the desired coated pigment may not be obtained.

In the step of stirring the liquid mixture, the stirring time may be any time sufficient to form the desired molybdenum-containing coating. In the present invention, it is preferably 0.5 to 10 hours for example, or more preferably 1 to 5 hours. If the stirring time is less than 0.5 hours, the desired effect of treatment tends to be insufficient. If it exceeds 10 hours, on the other hand, the treatment costs tend to increase.

Particles having a formed second coating layer may be collected after completion of the step of stirring the liquid mixture containing the metal particle and molybdenum compound. In this case, known washing and solid-liquid separation steps or the like may be performed as necessary. For example, the liquid mixture is preferably washed with a hydrophilic organic solvent and filtered with a filter or the like, and water and unreacted material are then removed from the resulting cake containing a metal particle having a molybdenum-containing coating film. A molybdenum-containing coating film may thus be formed as the second coating layer. When another second coating layer is to be formed, this may be carried out by the methods described above.

Stirring Step

In the manufacturing method of the invention, at least the step of forming the silicon compound-containing layer is performed under stirring. More specifically, it is necessary that the reaction system be under stirring at least when the pH is adjusted or when the catalyst is added. By thus performing the step of forming the silicon compound-containing layer under stirring, it is possible to effectively inhibits adhesion of composite particles to one another via the silicon compound-containing layer, or deposition of the silicon compound-containing layer on aggregates particles formed from metal particles. As a result, it is possible to more reliably obtain a pigment of the invention in which the proportion of aggregates constituted by adhesion of four or more composite particles is not more than 35% by number.

In the present invention, moreover, stirring is preferably performed not only during the step of forming the silicon compound-containing layer, but throughout all steps. That is, stirring is preferably performed at least from the point at which the metal particle is dispersed in the solvent until the end of the reaction (the point at which formation of all desired layers on the surface of the metal particle is complete). When stirring is ended or interrupted before the reaction is complete, there is a risk that metal particles or composite particles may aggregate due to the presence of unreacted components, and the desired coated particle may not be obtained.

Stirring itself may be performed with a known or commercial stirring apparatus. For example, at least one kneader, kneading machine, rotating container agitator, stirring reaction tank, V-shaped mixer, double cone mixer, screw mixer, sigma mixer, flash mixer, airflow agitator, ball mill, edge runner mixer or the like may be used.

Of these, an apparatus that mixes with a stirring blade (impeller) is desirable. In addition to the circulating action that causes the reaction system composed of a liquid phase as a whole to flow, an impeller blade also effectively inhibits aggregates through a pressure shear action.

The shape of the impeller is not particularly limited, and for example a propeller shape, turbine shape, fan turbine shape, paddle shape, inclined paddle shape or gate shape may be used. Impellers of these shapes can be combined in multiple stages.

The stirring speed is preferably such that the impeller blade is not exposed by the vortex created by stirring. A cylindrical tank or square tank or a tank equipped with a baffle plate or the like may preferably be used to prevent the vortex created by stirring.

The degree of stirring is not particularly limited as long as a good dispersion can be obtained, but the stirring Reynolds number (hereunder abbreviated as "stirring Re number") is preferably at least 6,000, or more preferably at least 10,000. The maximum stirring Re number may differ according to the type and scale of the stirring apparatus for example, and may be about 100,000 in the case of an ordinary laboratory scale apparatus for example, but may also exceed 100,000 in a range that does not substantially adversely affect the advantages of the present invention. An Re number of 1,000,000 is also allowable in the present invention for example.

In the present invention, the stirring Re number is calculated by the following formula:

$$\text{Stirring Re number} = (\rho \times n \times d^2)/\mu$$

(in which $\rho$ is the density (kg/m$^3$) of the liquid mixture at 25° C., n is the stirring rotation (rps), d is the impeller span (blade diameter) (m), and $\mu$ is the viscosity (Pa·s) of the liquid mixture at 25° C.).

Thus, in the manufacturing method of the invention the stirring Re number can be controlled by setting the optimum stirring rotation and impeller span in relation to the physical properties of the liquid mixture used for example. In this case, the ranges of these values are not particularly limited as long as the stirring Re number is set within the above range. As one example, the stirring rotation may be set within a range of 1 to 100 rps, the impeller span within a range of 0.1 to 5 m, the density within a range of 500 to 1,500 kg/m$^3$ and the viscosity within a range of 1,000 to 30,000 Pa·s according to the type of apparatus used and the like if necessary.

Composite Particle Collection Step

After completion of the step of forming the silicon compound-containing layer on the metal particle, the resulting composite particle (coated pigment) may be collected. In this case, known treatments such as washing, solid-liquid separation and the like can be performed as necessary. For example, it is desirable to first wash the dispersion solution with an organic solvent, filter it with a filter, and then remove the water and unreacted material from the resulting cake containing the composite particle. The cake containing the composite particle may then also be heated treated as necessary at a temperature in the range of 100° C. to 500° C. for example.

3. Resin Composition

The present invention encompasses a resin composition containing the pigment of the invention and a resin component. It also encompasses a molded body of the resin composition.

The resin component is not particularly limited, and for example an acrylic resin, alkyd resin, polyester resin, polyurethane resin, polyvinyl acetate resin, nitrocellulose resin, fluorine resin or the like may be used by preference.

A coloring pigment other than the pigment of the invention can also be used in the resin composition of the invention as necessary. Examples include phthalocyanine, quinacridone, isoindolinone, perylene, azo lake, iron oxide, chrome yellow, carbon black, titanium oxide, pearl mica and the like.

Various additives can also be added to the resin composition as necessary. Examples include surfactants, curing agents, UV absorbers, antistatic agents, thickeners, extender pigments, dyes, corrosion inhibitors and the like. Water or an organic solvent (particularly a hydrophilic organic solvent) or the like may also be included.

The content of the pigment of the invention in the resin composition of the invention is not limited, but may normally be 0.1 to 30 mass %, or preferably 1 to 20 mass %. If the content is less than 0.1 mass % the decorative effect (metallic appearance) tends to decline. If it exceeds 30 mass %, the characteristics of the resin composition (weather resistance, corrosion resistance, mechanical strength, etc.) may be insufficient.

The resin composition of the present invention can be used as is as a paint or ink, or it can be added to commercial available paints, inks and the like. Such paints and inks can be used as a water-based paint and water-based ink by preference.

The resin composition of the invention may also be molded as is to provide a molded body. The resin composition of the invention may also be kneaded and molded together with a rubber composition, plastic composition or the like. A molded body of the resin composition of the invention can have a good external appearance with excellent metallic appearance, and can also be excellent in weather resistance and stability.

5. Water-Based Paint and Water-Based Ink Containing Pigment of Invention

The present invention also encompasses a water-based paint and water-based ink (hereunder sometimes called together a "water-based paint or the like") containing the pigment of the invention together with at least one of a solvent and a binder. A water-based paint or the like containing the pigment of the invention together with a solvent and a binder can be used by preference.

The binder used in the water-based paint or the like containing the pigment of the invention is not particularly limited, but for example a resin binder such as an acrylic resin, alkyd resin, polyester resin, polyurethane resin, polyvinyl acetate resin, nitrocellulose resin, fluorine resin or the like can be preferably used. One or two or more kinds of these can be used.

The binder used in the water-based paint or the like may be any binder commonly used in known water-based paints and the like that can be coated and cured to form a good coating film, and in addition to resin binders, organic components such as rubber compositions, plastic compositions and natural polymer compositions can also be used as binders.

The water-based paint or the like may also contain another coloring pigment other than the pigment of the invention to the extent that this does not detract from the profitable effects of the invention. This coloring pigment is not particularly limited, but examples include phthalocyanine, quinacridone, isoindolinone, perylene, azo lake, iron oxide, chrome yellow, carbon black, titanium oxide, pearl mica and the like.

Additives that are added to know water-based paints and the like can also be added as necessary. Examples include surfactants, curing agents, UV absorbers, antistatic agents, thickeners, extender pigments, dyes or the like.

The solvent can be any water-based solvent, and for example water or a mixed solvent of water and a hydrophilic organic solvent or the like can be used. The hydrophilic organic solvent is not particularly limited, but examples include methyl alcohol, ethyl alcohol, isopropyl alcohol, n-propyl alcohol, t-butyl alcohol, n-butyl alcohol, isobutyl alcohol, ethyl cellosolve, butyl cellosolve, propylene glycol monobutyl ether, dipropylene glycol monomethyl ether, propylene glycol monopropyl ether, acetone and the like.

The content of the pigment of the invention in the water-based paint or the like is not particularly limited, but is preferably 0.1 to 30 mass %, or more preferably 1 to 20 mass % of the binder content. If the content of the pigment of the invention is less than 0.1 mass %, the decorative effect (metallic appearance) of a coating of the water-based paint or the like will tend to decline, while if the content exceeds 30 mass % the coating properties (weather resistance, corrosion resistance, mechanical strength, etc.) of the water-based paint or the like may be insufficient.

The content of the solvent may be set appropriately according to the type of the pigment of the invention used and the like, but normally is preferably 20 to 200 mass %, or more preferably 50 to 100 mass % of the binder content. If the solvent content is less than 20 mass %, the viscosity of the paint or ink increases, and it may be difficult to handle. If it exceeds 200 mass %, on the other hand, it may be difficult to perform the film forming because the viscosity of the paint or ink is too low.

The applications of the pigment of the invention are not limited to adding in water-based paints and the like, and it can also be added to paints containing organic solvents, inks containing organic solvents, powder coatings, rubber compositions, plastic compositions, natural macromolecular compositions and the like.

The method for coating or printing the water-based paint or the like is not particularly limited, and various coating methods and printing methods can be adopted appropriately according to the form of the water-based paint or the like, the surface shape of the object to be decorated and the like. Examples of coating methods include spray methods, roll coater methods, brush painting methods, doctor blade methods and the like. Examples of printing methods include gravure printing, screen printing and the like.

A coating film formed with a water-based paint or the like containing the pigment of the invention can also be formed on an under coating or intermediate coating formed by electrodeposition or the like. A top coat layer or the like can also be formed on a coating formed with the water-based paint or the like if necessary.

In this case, each coating layer may be applied and cured or dried before applying the next coating layer, or the next coating layer may be applied without curing or drying the previous coating layer in so-called "wet-on-wet" coating. To obtain a coating with good mirror brilliance in the present invention, it is desirable to employ a method including a step in which a coating layer of the water-based paint is formed after an under coating has been applied and then cured or dried.

The method of curing the coating composition of each coating layer may be a heat curing method or a room-temperature curing method for example. The method for drying the coating composition of each coating layer may be a hot air drying method, or a natural drying method at room temperature.

In this case, the thickness of the coating layer formed from the water-based paint or the like is not particularly limited, but in an ordinary embodiment it may be about 2 to 100 μm, or preferably 5 to 50 μm. If the coating layer is less than 2 μm thick, the hiding effect of the substrate by the ink or paint may be insufficient. If the thickness exceeds 100 μm, drying becomes difficult, and there may be more defects such as bubbles and sagging.

EXAMPLES

Features of the invention are explained in more detail below using Examples and Comparative Examples. However, the scope of the invention is not limited to the Examples.

Example 1

First, commercial aluminum pigment flakes (product name "7670NS", manufactured by Toyo Aluminum K.K., average particle diameter 15 μm, aspect ratio 68) in the amount of 100 g as solids were added to 1,000 g of isopropyl alcohol, and thoroughly mixed to prepare an aluminum slurry. At this point the aluminum slurry had a viscosity of about 10 mPa·s (25° C.), and a liquid density of about 830 kg/m$^3$ (25° C.). This aluminum slurry was placed in a roughly 4.5 L round-bottomed flask, and heated to 50° C. under stirring with a three-bladed propeller stirrer (Tokyo Rikakikai Co., Ltd., marine blade) so that the stirring Reynolds number was 19,000. In the following steps, stirring was also performed so as to maintain the same stirring Reynolds number.

Next, 0.5 g of metal molybdenum powder was added bit by bit to 10 g of hydrogen peroxide water containing 30% hydrogen peroxide, and reacted to prepare a solution. The resulting aqueous solution containing molybdenum was added gradually to the previous aluminum slurry, and stirred continuously as is for 60 minutes.

Monoethanolamine was then added to the above slurry to adjust the pH of the slurry to the range of 8.0 to 10.

40 g of tetraethoxysilane (hereunder abbreviated as "TEOS") was then added gradually to the pH-adjusted slurry, which was then further stirred for 5 hours at 50° C. After completion of this reaction, the slurry was subjected to solid-liquid separation with a filter, and the concentration was adjusted with isopropyl alcohol to a solids content of 50% to obtain a coated aluminum pigment comprising a flake-shaped composite particle.

The stirring Reynolds number (stirring Re number) here is calculated by the following formula:

$$\text{Stirring Re number} = (\rho \times n \times d^2)/\mu$$

ρ: density (kg/m$^3$) of liquid dispersion containing metal particle at 25° C.

n: stirring rotation (rps)

d: impeller span (m)

μ: viscosity (Pa·s) of liquid dispersion containing metal particle at 25° C.

Example 2

A coated aluminum pigment was obtained by the same operations as in Example 1 except that the stirring Re number was 14,000.

Example 3

A coated aluminum pigment was obtained by the same operations as in Example 1 except that the stirring Re number was 10,005.

Example 4

A coated aluminum pigment was obtained by the same operations as in Example 1 except that the stirring Re number was 12,000.

Example 5

A coated aluminum pigment was obtained by the same operations as in Example 1 except that a flake-shaped aluminum pigment having an average particle diameter of 6 μm was used, and the stirring Re number was 19,200.

Example 6

A coated aluminum pigment was obtained by the same operations as in Example 1 except that a flake-shaped aluminum pigment with an average particle diameter of 25 μm was used, and the stirring Re number was 10,000.

Example 7

A coated aluminum pigment was obtained by the same operations as in Example 1 except that a flake-shaped aluminum pigment with an average particle diameter of 32 μm was used, and the stirring Re number was 10,000.

Comparative Example 1

A coated aluminum pigment was obtained by the same operations as in Example 1 except that the stirring Re number was 5,000.

Test Example 1

The particle diameters and the like of the coated aluminum pigments obtained in the examples and comparative examples were measured. The results are shown in Table 1.

TABLE 1

|  | Stirring Re number | Coated pigment D50 (μm) | Proportion of aggregates of at least four particles (%) | L*15° value |
| --- | --- | --- | --- | --- |
| Example 1 | 19011 | 15 | 5 | 128.8 |
| Example 2 | 14008 | 15 | 10 | 127.2 |
| Example 3 | 10005 | 15 | 35 | 122.8 |
| Example 4 | 12000 | 15 | 20 | 125.5 |
| Example 5 | 19200 | 8 | 30 | 110.0 |
| Example 6 | 10000 | 28 | 5 | 135.8 |
| Example 7 | 10000 | 32 | 5 | 130.3 |
| Comparative Example 1 | 5000 | 15 | 40 | 117.3 |

The particle diameters and the like of the coated pigments obtained in the Examples and Comparative Examples were measured as follows.

(1) Particle Diameter

A "Microtrac MT3000 II" laser diffraction particle size analyzer was used as the analysis device. About 0.1 g of coated pigment was first dispersed in 20 g of isopropyl alcohol. This dispersion was loaded into the Microtrac, dispersed for 1 minute with the ultrasound disperser accessory to the device (output 40 W), and measured. The circulating solvent in the device was isopropyl alcohol that was the same as the dispersion solvent. The particle size distribution was then measured immediately. The D50 in the present invention is the median diameter in the volume-based distribution.

(2) Evaluating Degree of Overlapping by Composite Particles 16.9 g of NIPPONPAINT Co., Ltd. Nax Admila 280 correction clear was mixed with 2.8 g of Nax Admila 901 binder, and stirred with a glass rod to prepare a paint. Next, the pigment obtained in the Examples and Comparative Examples in the amount of 1.2 g as solids was added to the paint, and stirred with a glass rod. This was then thoroughly dispersed with a stirring deaerator to prepare a paint containing a dispersed aluminum pigment.

The prepared paint with dispersed aluminum pigment was applied with a 9-mil applicator to a polyethylene terephthalate film (PET film), left for 20 minutes at room temperature, and then baked for 20 minutes at 140° C. The resulting coated film was peeled off the PET film to obtain a test piece for observation.

The test piece for observation was worked into a sample piece for cross-sectional observation with an ion milling/cross-section polisher (Hitachi High-Technologies Corporation "E-3500"). The worked test piece was then observed with an FE-SEM (Hitachi High-Technologies Corporation "SU8200") to observe the degree of overlapping among particles.

First, if overlapping was easily detected, the test piece was observed at a magnification of about 1,000× to 3,000×. If overlapping was not detected at this magnification, overlapping was evaluated by changing the magnification appropriately. In this observation method, observation was performed up to a maximum magnification of roughly 100,000×. Multiple visual fields were observed from a cross-section of the same sample until the number of observed particles was at least 500. Examples of such visual field observation are shown in FIGS. 1 and 2. While numerous aggregates constituted by at least four composite particles are seen in FIG. 1 (Comparative Example 1), in FIG. 2 (Example 1) the composite particles are in a roughly independent state.

When it is difficult to detect aggregates (aggregated states) by such an observation method, aggregation can further evaluated according to the following criteria a) and b).

- a) No aggregation exists when the minimum distance "d" between the substrate metal (metal particle) surfaces of the measured particles is at least 2 times of the average thickness "t" of the coating layer.
- b) Aggregation exists if the minimum distance "d" between the substrate metal (metal particle) surfaces of the measured particles is less than 2 times of the average thickness "t" of the coating layer.

The average coating layer thickness of 100 random particles was given as the average thickness of the coating layer.

(3) Color Tone Evaluation

The L*15° value obtained with an X-Rite Inc. "MA68II" multi-angle spectrophotometer was adopted for evaluating the color tone of the test sample. Color was measured 5 times from an aluminum pigment-containing coating prepared by the methods described above, and the average value was used. When measuring color tone, the profitable effect of the present invention can be evaluated accurately with an integrating sphere spectrophotometer rather than a multi-angle spectrophotometer, although there will be some difference in the absolute brightness value.

The invention claimed is:

1. A method for manufacturing a coated pigment,
    (1) the method comprising a step in which an organic silicon compound is hydrolyzed in a liquid mixture containing (a) a flake-shaped metal particle, (b) a silicon-containing raw material including at least one kind of the organic silicon compound and (c) a solvent to thereby form a silicon compound-containing layer on the surface of the metal particle, and
    (2) at least the step is performed under stirring with a stirring blade so that the stirring Reynolds number Re=$(\rho \times n \times d^2)/\mu$, in which $\rho$ is the density (kg/m$^3$) of the liquid mixture at 25° C., n is the stirring rotation (rps), d is the impeller span (blade diameter) (m), and $\mu$ is the viscosity of the liquid mixture at 25° C., is at least 10,000.

2. The method according to claim 1, wherein the stirring is performed at least from the point at which the metal particle is dispersed in the solvent until the end of the point at which formation of all desired layers on the surface of the metal particle is complete.

3. The method according to claim 1, wherein the solvent is (1) water, (2) a hydrophilic organic solvent, or (3) a mixed solvent of these.

4. The method according to claim 1, wherein the amount of the solvent is 500 to 10,000 parts by mass per 100 parts by mass of the metal particle.

5. The method according to claim 1, wherein the temperature of the liquid mixture is 20° C. to 90° C.

6. The method according to claim 1, wherein a basic hydrolysis catalyst is included in the liquid mixture.

7. The method according to claim 1, wherein the silicon compound-containing layer is hydrophilic.

8. The method according to claim 1, wherein the metal particle comprises a molybdenum-containing coating film on the surface of the metal particle, wherein the molybdenum-containing coating film is prepared by stirring a dispersed solution containing the metal particle and a molybdenum compound.

9. The method according to claim 8, wherein the molybdenum compound is peroxo-polymolybdic acid.

10. The method according to claim 1, wherein the coated pigment comprises a composite particle containing a metal particle and one or two or more coating layers on the surface of the metal particle, wherein
    (1) at least one of the coating layers is a silicon compound-containing layer, and
    (2) the proportion of the number of aggregates formed by adhesion of at least four of the composite particles to each other is not more than 35%.

* * * * *